(12) United States Patent
Asjad

(10) Patent No.: US 9,067,469 B2
(45) Date of Patent: Jun. 30, 2015

(54) WHEEL STABILIZATION MECHANISM AND METHOD

(71) Applicant: GM GLOBAL TECHNOLOGY OPERATIONS LLC, Detroit, MI (US)

(72) Inventor: Moin U. Asjad, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/895,419

(22) Filed: May 16, 2013

(65) Prior Publication Data

US 2014/0339782 A1 Nov. 20, 2014

(51) Int. Cl.
*B60G 17/005* (2006.01)
*B60G 17/00* (2006.01)
*B62D 21/15* (2006.01)

(52) U.S. Cl.
CPC .............. *B60G 17/00* (2013.01); *B62D 21/155* (2013.01); *B60G 17/005* (2013.01); *B62D 21/152* (2013.01)

(58) Field of Classification Search
CPC ................. B60G 17/00; B60G 17/005; B60R 2019/002; B60S 9/00; B62D 7/22; B62D 21/152155; B62D 49/08
USPC ........... 280/5.501, 5.515, 781, 782, 784, 798, 280/776, 754, 755; 180/274, 280; 296/187.03, 187.09, 187.1
See application file for complete search history.

(56) References Cited

U.S. PATENT DOCUMENTS

| | | | | |
|---|---|---|---|---|
| 1,800,142 | A * | 4/1931 | Heagney | 180/280 |
| 1,936,054 | A * | 11/1933 | Harzbecker | 180/280 |
| 2,159,651 | A * | 5/1939 | Brockett | 180/280 |
| 3,789,944 | A * | 2/1974 | Barenyi | 180/68.6 |
| 3,881,742 | A * | 5/1975 | Felzer | 280/784 |
| 4,826,209 | A * | 5/1989 | Farris | 280/784 |
| 5,275,436 | A * | 1/1994 | Pomero | 280/784 |
| 5,482,322 | A * | 1/1996 | Wheatley et al. | 280/784 |
| 6,511,119 | B2 * | 1/2003 | Takase et al. | 296/187.09 |
| 6,866,115 | B2 * | 3/2005 | Miyasaka | 180/311 |
| 6,942,261 | B2 * | 9/2005 | Larsen et al. | 293/107 |
| 6,994,374 | B2 * | 2/2006 | Miyasaka | 280/784 |
| 7,819,218 | B2 * | 10/2010 | Eichberger et al. | 180/274 |
| 7,900,995 | B2 * | 3/2011 | Sato et al. | 296/187.1 |
| 7,926,847 | B2 * | 4/2011 | Auer et al. | 280/784 |
| 8,393,669 | B2 * | 3/2013 | Ajisaka | 296/187.09 |
| 8,544,589 | B1 * | 10/2013 | Rupp et al. | 180/274 |
| 8,562,021 | B1 * | 10/2013 | Kuwabara et al. | 280/784 |
| 2001/0024053 | A1 * | 9/2001 | Takase et al. | 296/189 |
| 2003/0090099 | A1 * | 5/2003 | Miyasaka | 280/784 |
| 2008/0023954 | A1 * | 1/2008 | Eichberger et al. | 280/784 |
| 2009/0302591 | A1 * | 12/2009 | Auer et al. | 280/784 |
| 2011/0083923 | A1 * | 4/2011 | Ajisaka | 180/291 |
| 2013/0257028 | A1 * | 10/2013 | Kuwabara et al. | 280/784 |
| 2014/0159420 | A1 * | 6/2014 | Hashimoto et al. | 296/187.1 |
| 2014/0159423 | A1 * | 6/2014 | Chang | 296/187.09 |
| 2015/0000995 | A1 * | 1/2015 | Konchan et al. | 180/280 |

* cited by examiner

*Primary Examiner* — Ruth Ilan
*Assistant Examiner* — Barry Gooden, Jr.
(74) *Attorney, Agent, or Firm* — Quinn Law Group, PLLC

(57) ABSTRACT

A wheel stabilization mechanism includes an actuator configured to be coupled to a vehicle body and a wheel stabilizer configured to be movably coupled to the vehicle body such that the wheel stabilizer is configured to move with respect to a wheel. The actuator is configured to move the wheel stabilizer with respect to the wheel from a disengaged position toward an engaged position in response to a force applied to the vehicle body. In the engaged position, the wheel stabilizer is configured to inhibit at least a portion of the wheel from moving with respect to the vehicle body to minimize movement of the wheel with respect to the vehicle body.

9 Claims, 9 Drawing Sheets

WHEEL STABILIZATION MECHANISM AND METHOD

TECHNICAL FIELD

The present disclosure relates to wheel stabilization mechanisms, systems, and methods configured to minimize the movement of a vehicle wheel during an impact.

BACKGROUND

Many vehicles currently include energy absorption devices. These energy absorption devices can absorb and manage the kinetic energy exerted on the vehicle during a vehicular accident. To do so, some energy absorption devices include deformable metallic components that are configured to deform during an impact.

SUMMARY

The present disclosure relates to wheel stabilization mechanisms configured to minimize the movement of a vehicle wheel. In an embodiment, the wheel stabilization mechanism includes an actuator configured to be coupled to a vehicle body and a wheel stabilizer configured to be movably coupled to the vehicle body such that the wheel stabilizer is configured to move with respect to a wheel. The actuator is configured to move the wheel stabilizer with respect to the wheel from a disengaged position toward an engaged position in response to a force, sometimes eccentric, applied to the vehicle body. In the engaged position, the wheel stabilizer is configured to inhibit at least a portion of the wheel from moving with respect to the vehicle body to minimize movement of the wheel with respect to the vehicle body. The force may be eccentric to the vehicle body.

In an embodiment, the vehicle body includes a frame configured to be coupled to the wheel. The actuator includes a rod movably coupled to the frame. The frame includes a first frame end and a second frame end opposite the first frame end. The actuator further includes a plate coupled to the rod. The plate is adjacent the first frame end. The rod is configured to move with respect to the frame from a first rod position toward a second rod position in response to the force applied to the vehicle body, sometimes eccentric. The rod is configured to urge the wheel stabilizer to move from the disengaged position toward the engaged position as the rod moves from the first rod position toward the second rod position. The wheel stabilizer includes a lever pivotally coupled to the frame. The actuator includes at least one extension protruding from the rod. The extension is configured to contact the lever as the rod moves from the first rod position to the second rod position to move the wheel stabilizer from the disengaged position toward the engaged position.

In an embodiment, the actuator includes a movable actuator portion movably coupled to the rod. The movable actuator portion is configured to move in response to the force applied to the vehicle body to move the rod with respect to the frame from the first rod position toward the second rod position. The movable actuator portion is pivotally coupled to the rod.

In an embodiment, the wheel stabilization mechanism further includes a sensor configured to be coupled to the vehicle body. The sensor is configured to detect the impact. The wheel stabilizer includes a plunger configured to move with respect to the wheel from a first plunger position toward the second plunger position when the sensor detects the impact. The actuator includes an actuator body, a propellant inside the actuator body, and an igniter coupled to the actuator body. The igniter is configured to ignite the propellant when the sensor detects the impact to move the plunger with respect to the actuator body from the first plunger position toward the second plunger position. The actuator may be configured to be coupled to an engine cradle. The actuator may be configured to be coupled to a rocker panel.

The present disclosure also relates to vehicles including a wheel stabilization mechanism. In an embodiment, the vehicle includes a vehicle body, a wheel coupled to the vehicle body, an actuator coupled to a vehicle body, and a wheel stabilizer movably coupled to the vehicle body. The actuator is configured to move the wheel stabilizer with respect to the wheel from a disengaged position and an engaged position in response to a force, sometimes eccentric, applied to the vehicle body. In the engaged position, the wheel stabilizer is configured to inhibit at least a portion of the wheel from moving with respect to the vehicle body to minimize movement of the wheel with respect to the vehicle body. The vehicle body includes a frame configured to be coupled to the wheel. The actuator includes a rod movably coupled to the frame. The rod is configured to move with respect to the frame from a first rod position toward a second rod position in response to the force applied to the vehicle body. The actuator may include at least one extension protruding from the rod. The extension may be configured to contact the wheel stabilizer as the rod moves from the first rod position to the second rod position to move the wheel stabilizer from the disengaged position toward the engaged position. The wheel stabilizer may include a lever pivotally coupled to the frame.

The present disclosure also relates to a method of manufacturing a vehicle. In an embodiment, the method includes coupling a wheel to a vehicle body via an axle. The method further includes coupling an actuator to a vehicle body. In addition, the method further includes movably coupling a wheel stabilizer to the vehicle body. The actuator is configured to move the wheel stabilizer with respect to the wheel from a disengaged position to an engaged position, sometimes eccentric, to minimize movement of the wheel with respect to the vehicle body.

The present disclosure also relates to a method of controlling a crush mode of a vehicle body structure movable longitudinally and rollingly supported on a tire/wheel rotatable in a longitudinal plane. In an embodiment, this method includes providing said vehicle body structure with a tire/wheel stabilizer actuatable between first and second positions with respect to said tire/wheel and; actuating said tire/wheel stabilizer to one of said positions in response to a vehicle impact eccentric to a longitudinal movement of said vehicle body structure.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
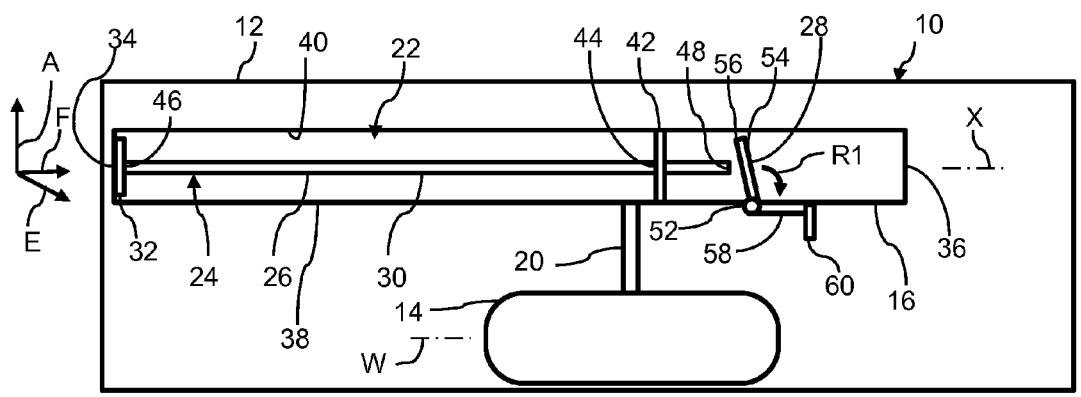
FIG. 1 is a schematic top view of a vehicle including a wheel stabilization mechanism having a wheel stabilizer in a disengaged position.

Referring to the drawings, wherein like reference numbers correspond to like or similar components throughout the several figures, and beginning with FIG. 1, a vehicle 10 includes a vehicle body 12 and one or more wheels 14 coupled to the vehicle body 12. Although the drawings show only one wheel 14, it is envisioned that the vehicle 10 may include more than one wheel 14. For example, the vehicle 10 may include four or two wheels 14. The wheels 14 may be coupled to a portion of the vehicle body 12 via an axle 20 and is substantially aligned to rotate within a plane W.

The vehicle body 12 further includes a frame 16 coupled to the wheel 14 via the axle 20. The frame 16 may be elongated along a longitudinal axis X and defines a first frame end 34 and a second frame end 36 opposite the first frame end 34.

Moreover, the frame 16 defines an outer frame surface 38 and an inner frame surface 40 opposite the outer frame surface 38. The inner frame surface 40 may define an interior frame cavity 22. Hence, the frame 16 may define the interior frame cavity 22. The interior frame cavity 22 is configured, shaped, and sized to receive at least a portion of a wheel stabilization mechanism 24. The frame 16 may be configured as a rail.

The wheel stabilization mechanism 24 is configured to minimize the movement of the wheel 14 outside the plane W with respect to the axis X of the vehicle body 12 during a vehicular accident such as an impact. During an impact, the wheel 14 may move away from or toward the vehicle body 12. For instance, the wheel 14 may move into the vehicle body 12 during an impact, thereby exerting extraordinary forces to portions of the vehicle body 12. In such cases, the vehicle body 12 absorbs such forces. Therefore, a wheel stabilization mechanism 24 is configured to control the crush mode in a load carrying structural member for optimized impact energy absorption during a vehicle impact. In addition to highly non-linear crush behavior during the impact event, when the impact point is not symmetric and the structure is only contacting the impact surface at an offset, optimized energy absorption becomes even more challenging. During the later stage of the impact event if the impact loading is symmetric, a major portion of the impact load is transferred via the tire/wheel to the body structure, but when the impact surface is eccentric to one side of the vehicle structure, the tire/wheel starts moving away from on toward the body structure. This movement causes additional load to transfer through the structural members. This invention optimizes the crush energy absorption during such an eccentric (offset) crush event.

Figure 2:
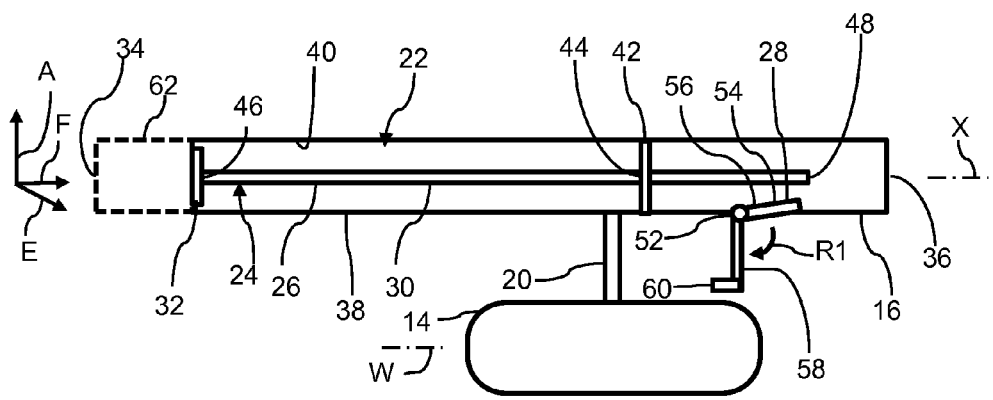
FIG. 2 is a schematic top view of the wheel stabilization mechanism shown in FIG. 1, depicting the wheel stabilizer in an engaged position.

With reference to FIGS. 1 and 2, during such an impact, an object may exert a force on the vehicle body 12 in a first direction indicated by arrow F or eccentrically in an eccentric direction indicated by arrow E. The wheel stabilization mechanism 24 can prevent, or at least inhibit, the wheel 14 from moving with respect to the vehicle body 12 during the impact. Specifically, the wheel stabilization mechanism 24 can preclude, or at least hinder, at least a portion of the wheel 14 from moving away from or toward the vehicle body 12. In the depicted embodiment, the wheel stabilization mechanism 24 includes an actuator 26 and a wheel stabilizer 28. The actuator 26 is coupled to a portion of the vehicle body 12, such as the frame 16, and is configured to move the wheel stabilizer 28 from a disengaged position (FIG. 1) to an engaged position (FIG. 2) in the event of an impact. In the disengaged position (FIG. 1), the wheel stabilizer 28 does not inhibit the wheel 14 from moving with respect to the vehicle body 12. Conversely, in the engaged position, the wheel stabilizer 28 prevents, or at least inhibits, at least a portion of the wheel 14 from moving with respect to the vehicle body 12.

The actuator 26 may be at least partly disposed within the frame 16. In particular, the actuator 26 may be wholly or partly disposed in the interior frame cavity 22 and includes a rod 30 and a plate 32 coupled to the rod 30. The plate 32 and rod 30 may both be made of a substantially rigid material such as a metallic material. The rod 30 may be elongated along the longitudinal axis X and defines a first rod end 46 and a second rod end 48 opposite the first rod end 46. The first rod end 46 is spaced apart from the second rod end 48 along the longitudinal axis X. The second rod end 48 is closer to the second frame end 36 than to the first frame end 34. The first rod end 46 is closer to the first frame end 34 than the second frame end 36.

The plate 32 is coupled to the first rod end 46 of the rod 30. Before an impact, the plate 32 is disposed adjacent the first frame end 34 of the frame 16. For example, the plate 32 may contact a portion of the inner frame surface 40 before an impact. As discussed in detail below, the plate 32 may move in the first direction indicated by arrow F in response to a force exerted on the vehicle body 12 during an impact. Because the rod 30 is connected to the plate 32, the rod 30 may also move in the first direction indicated by arrow F in response to a force applied to the vehicle body 12 during an impact.

In addition to the rod 30 and the plate 32, the actuator 26 may include a guide 42 configured to maintain the rod 30 disposed along the longitudinal axis X before, during, and after an impact. In the depicted embodiment, the guide 42 is configured as a bracket 44 and is coupled to the frame 16. As such, the guide 42 remains stationary with respect to the frame 16, the rod 30, and the plate 32. The guide 42 may be disposed between the first rod end 46 and the second rod end 48 of the rod 30. In the depicted embodiment, the guide 42 is disposed closer to the second rod end 48 than to the first rod end 46. The guide 42 may be elongated in a second direction indicated by arrow A. The second direction may be substantially perpendicular to the longitudinal axis X and the first direction, which is indicated by arrow F. As such, the rod 30 can slide along the guide 42. The guide 42 therefore maintains the rod 30 substantially disposed along the longitudinal axis X. In other words, the guide 42 maintains the rod 30 substantially aligned with the longitudinal axis X before, after, and during an impact. The rod 30 can therefore move along the longitudinal axis X from a first rod position (FIG. 1) toward a second rod position (FIG. 2) when a force is applied to the vehicle body 12 in the first direction, which is indicated by arrow F as discussed in detail below.

Aside from the guide 42, the wheel stabilization mechanism 24 includes the wheel stabilizer 28, which is configured to be movably coupled to a portion of the vehicle body 12 such as the frame 16. For example, the wheel stabilizer 28 may be pivotally coupled to the frame 16 via a pivot pin 52, a hinge, or any device, apparatus or means capable of pivotally coupling the wheel stabilizer 28 to the frame 16. The pivotal connection between the wheel stabilizer 28 and the frame 16 allows the wheel stabilizer 28 to pivot about the pivot pin 52 in a first rotational direction indicated by arrow R1 upon actuation of the actuator 26 as discussed in detail below. Specifically, the wheel stabilizer 28 may be pivotally coupled to the outer frame surface 38 of the frame 16. As such, the wheel stabilizer 28 can move between a disengaged position (FIG. 1) and an engaged position (FIG. 2).

In the embodiment depicted in FIGS. 1 and 2, the wheel stabilizer 28 may be a lever 54 configured to pivot with respect to the frame 16. The lever 54 includes a first lever arm 56 configured to be at least partly disposed in the interior frame cavity 22 when the lever 54 is in the disengaged position (FIG. 1). The first lever arm 56 may be directly coupled to the pivot pin 52. The lever 54 further includes a second lever arm 58, which may also be directly coupled to the pivot pin 52. The second lever arm 58 may be oriented at an oblique angle with respect to the first lever arm 56. Lever 54 may further include a third lever arm 60 coupled to the second lever arm 58. The third lever arm 60 may be oriented substantially perpendicular to the second lever arm 58. It is envisioned, however, that the third lever arm 60 may be oriented at an oblique angle relative to the second lever arm 58. When the lever 54 is in the disengaged position (FIG. 1), the first lever arm 54 may be oriented at an oblique angle relative to the longitudinal axis X, the second lever arm 56 may be substantially parallel to the longitudinal axis X, and the third lever arm 60 may be substantially perpendicular to the longitudinal axis X. When the lever 54 is in the engaged position (FIG. 2), the first lever arm 56 may be oriented at an oblique angle relative to the longitudinal axis X, the second lever arm 58 may be substantially perpendicular to the longitudinal axis X, and the third lever arm 60 may be substantially parallel to the longitudinal axis X.

With reference to FIG. 1, during an impact, another object, such as a wall or another vehicle, exerts a force on the vehicle body 12 of the vehicle 10. For instance, the force may be applied to the vehicle body 12 in the first direction indicated by arrow F. The application of this force on the vehicle body 12 may cause a portion 62 of the frame 16 to be crushed. As the portion 62 of the frame 16 is crushed, the force also causes the actuator 26 to move with respect to a portion of the vehicle body 12, such as the frame 16, in the first direction indicated by arrow F or eccentrically in an eccentric direction indicated by arrow E. In particular, during the impact, the actuator 26 moves from a first actuator position (FIG. 1) toward a second actuator position (FIG. 2) in response to the application of a force in the first direction indicated by arrow F or the eccentric direction indicated by arrow E.

As discussed above, the guide 42 can guide the movement of the actuator 26 with respect to the vehicle body 12. Consequently, as the actuator 26 moves with respect to the vehicle body 12 during an impact, the rod 30 moves from the first rod position (FIG. 1) toward a second rod position (FIG. 2) substantially along the longitudinal axis X. Eventually, the actuator 26 urges the wheel stabilizer 28 to move from the disengaged position (FIG. 1) toward the engaged position (FIG. 2). Specifically, the second rod end 48 of the rod 30 exerts a force on the first lever arm 56 in the first direction, which is indicated by arrow F, or in the eccentric direction, which is indicated by arrow E. As a consequence, the lever 54 pivots about the pivot pin 52 in the first rotational direction, which is indicated by arrow R1, toward the engaged position. In the engaged position, the lever 54 can inhibit the wheel 14 from moving out of the longitudinal plane W within which it is rotatable toward the frame 16, thereby preventing the wheel 14 moving into the vehicle body 12. When the lever 54 is in the engaged position, a portion of the rod 30 may be disposed adjacent the first lever arm 56 and prevents, or at least inhibits, the lever 54 from moving toward the disengaged position (FIG. 1).

During the impact, the force exerted by the object impacting the vehicle 10 may urge the wheel 14 to move toward or away from the frame 16. For example, the wheel 14 may have a tendency to move out of alignment within the wheel plane W during the impact. However, in the engaged position, the wheel stabilizer 28 may serve as a mechanical stop and prevents, or at least hinders, the wheel 14 from moving out of such alignment with the wheel plane W during the impact. In other words, the wheel stabilizer 28 can inhibit the wheel 14 from moving with respect to the vehicle body 12 during an impact, thereby minimizing movement of the wheel 14 relative to the vehicle body 12.

The present disclosure also relates to methods of manufacturing the vehicle 10. In an embodiment, the method includes coupling the wheel 14 to the vehicle body 12 via the axle 20. The method further includes coupling the actuator 26 to a portion of the vehicle body 12, such as the frame 16. The method further includes movably coupling the wheel stabilizer 28 to a portion of the vehicle body 12 such as the frame 16 so as to assemble the wheel stabilization mechanism 24 or any of the wheel stabilization mechanism described in the present disclosure.

Figure 3:
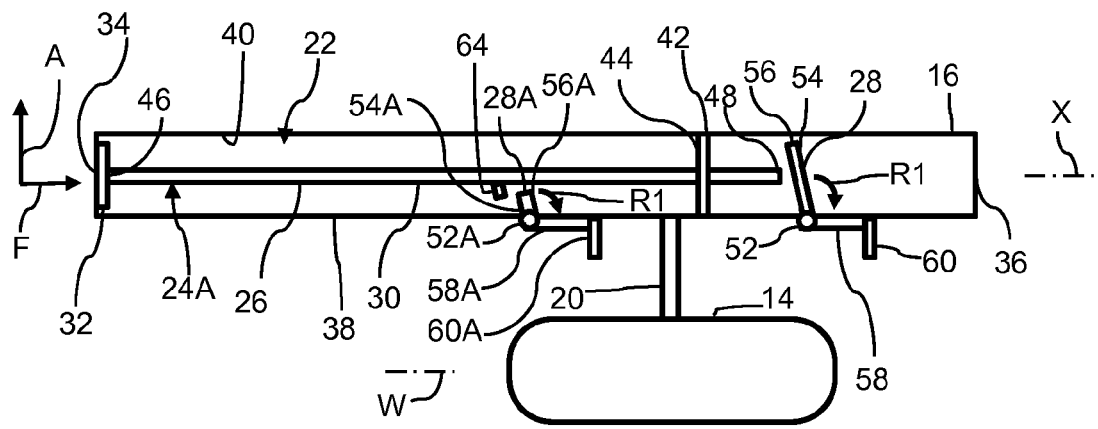
FIG. 3 is a schematic top view of a wheel stabilization mechanism in accordance with another embodiment of the present disclosure, showing more than one wheel stabilizer with each wheel stabilizer in a disengaged position.
Figure 4:
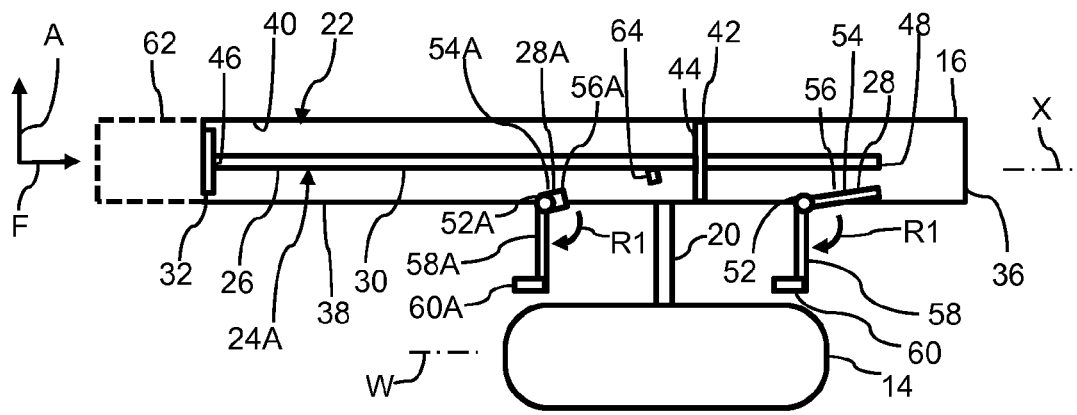
FIG. 4 is a schematic top view of the wheel stabilizer mechanism shown in FIG. 3, depicting each wheel stabilizer in an engaged position.

With reference to FIGS. 3 and 4, the wheel stabilization mechanism 24A may be substantially similar to the wheel stabilization mechanism 24 (FIG. 1). In other words, the wheel stabilization mechanism 24A may include some or all the components of the wheel stabilization mechanism 24. However, the wheel stabilization mechanism 24A additionally includes another wheel stabilizer 28A. Hence, in this embodiment, the wheel stabilizer 28 is referred to as the first wheel stabilizer 28, and the wheel stabilizer 28A is referred to as the second wheel stabilizer 28A. The structure and operation of the first wheel stabilizer 28 shown in FIG. 3 and the wheel stabilizer 28 shown in FIG. 1 are identical or substantially similar.

With continued reference to FIGS. 3 and 4, the actuator 26 includes an extension 64 protruding from the rod 30. The extension 64 may be coupled to the rod 30 or may be monolithically formed with the rod 30. Regardless, the extension 64 may be oriented at an oblique angle relative to the longitudinal axis X and is disposed between the first rod end 46 and the second rod end 48 of the rod 30.

The second wheel stabilizer 28A may be a second lever 54A movably coupled to a portion of the vehicle body 12 such as the frame 16. For example, the second wheel stabilizer 28A may be pivotally coupled to the frame 16 via a second pivot pin 52A, a hinge, or any device, apparatus or means capable of pivotally coupling the second wheel stabilizer 28A to the frame 16. The second lever 54A is substantially similar to the lever 54 (FIG. 1) and includes a plurality of lever arms 56A, 58A, 60A. However, the lever arm 56A may be shorter than the first lever arm 56 (FIG. 1) in order to avoid interference between the lever arm 56A and the rod 30.

During an impact, the wheel stabilization mechanism 24A operates substantially similar to the wheel stabilization mechanism 24 (FIG. 1). In this embodiment, as the rod 30 moves in the first direction indicated by arrow A, the extension 64 urges the second wheel stabilizer 28A from the disengaged position (FIG. 3) to the engaged position (FIG. 4). Specifically, the extension 64 urges the second wheel stabilizer 28A to pivot about the second pivot pin 52A with respect to the frame 16. Once in the engaged position, the second wheel stabilizer 28A functions as a mechanical stop and prevents, or at least hinders, the wheel 14 from moving out of alignment with the wheel plane W during the impact.

Figure 5:
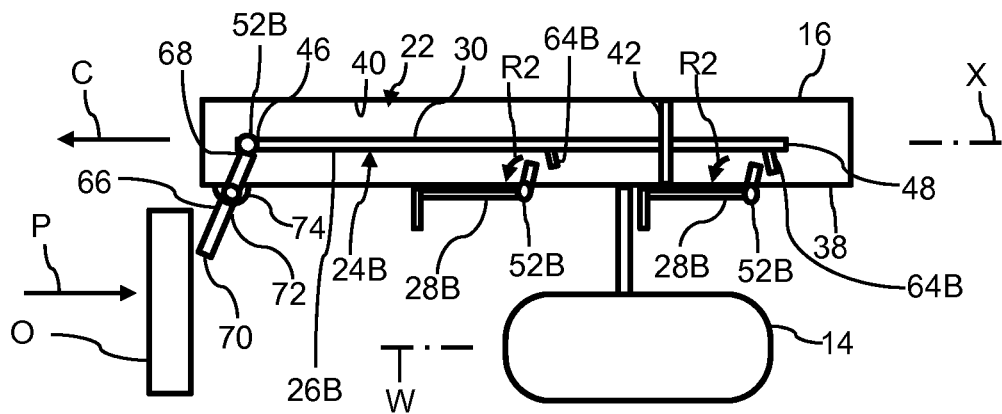
FIG. 5 is a schematic top view of a wheel stabilization mechanism in accordance with an alternative embodiment of the present disclosure, depicting wheel stabilizers in a disengaged position and an actuator movable portion in a first position.
Figure 6:
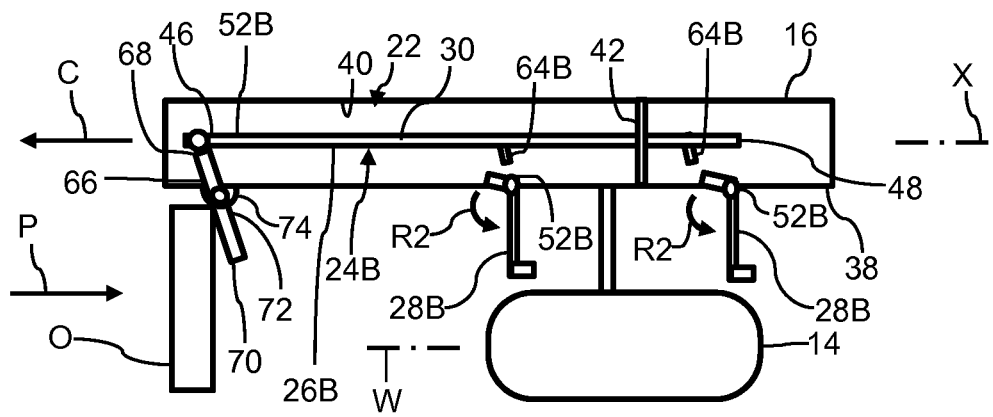
FIG. 6 is a schematic top view of the wheel stabilization mechanism shown in FIG. 5, depicting each wheel stabilizer in an engaged position and the actuator movable portion in a second position.

FIGS. 5 and 6 show a wheel stabilization mechanism 24B in accordance with an alternate embodiment of the present disclosure. In the depicted embodiment, the wheel stabilization mechanism 24B is similar to the wheel stabilization mechanism 24A shown in FIG. 3. Therefore, the wheel stabilization mechanism 24B may include some of the components of the wheel stabilization mechanism (FIG. 3). However, the wheel stabilization mechanism 24B does not include the plate 32 (FIG. 3).

The wheel stabilization mechanism 24B includes an actuator 26B and one or more wheel stabilizers 28B movably coupled to the frame 16. For example, a pivot pin 52B, a hinge, or any other suitable apparatus, device, or means can pivotally couple a respective wheel stabilizer 28B to the frame 16. The actuator 26B is partly disposed in the interior frame cavity 22 of the frame 16 and is configured to urge the wheel stabilizers 28B from the disengaged position (FIG. 5) toward the engaged position (FIG. 6) during an impact.

The actuator 26B includes a rod 30 and a guide 42 that are substantially similar to the rod and the guide described above with respect to FIG. 1. Instead of a rod 30, the actuator 26B may include a cable. The actuator 26B further includes one or more extensions 64B. The number of extensions 64B corresponds to the number of wheel stabilizers 28B. The extensions 64B protrude from the rod 30 and may be coupled to, or monolithically formed with, the rod 30. During an impact, each extension 64B is configured to urge a respective wheel stabilizer 28B to move from the disengaged position (FIG. 5) to the engaged position (FIG. 6). In particular, moving each extension 64B in a third direction, which is indicated by arrow C, causes a respective wheel stabilizer 28B to pivot about a respective pivot pin 52B in a second rotational direction as indicated by arrow R2.

The actuator 26B further includes a movable actuator portion 66 movably coupled to the rod 30 and the frame 16. Specifically, the movable actuator portion 66 includes a first end 68, a second end 70 opposite the first end 68, an intermediate section 72 disposed between the first end 68 and the second end 70. The first end 68 of the movable actuator portion 66 is pivotally coupled to the first rod end 46 of the rod 30. For instance, a pivot pin 52B may pivotally couple the first rod end 46 to the first end 68 of the movable actuator portion 66. The intermediate section 72 of the movable actuator portion 66 may be pivotally coupled to the frame 16. For example, a hinge assembly 74 may pivotally couple the intermediate section 72 to a portion of the outer frame surface 38 of the frame 16. The second end 70 is free and is not directly connected to the frame 16.

During an impact, an object 0, such as a wall, may impact the vehicle 10 (FIG. 1) and thus exerts an eccentric force E on the vehicle body 12 (FIG. 1). In particular, and with reference to FIGS. 5 and 6, the object 0 may apply a force on the movable actuator portion 66 in an eccentric fourth direction indicated by arrow P. In response, the intermediate section 72 of the movable actuator portion 66 pivots about the hinge assembly 74 and the first end 68 pivots about the pivot pin 52B interconnecting the rod 30 and the movable actuator portion 66. As a consequence, the movable actuator portion 66 urges the rod 30 (or cable) to move with respect to the frame 16 in in the third direction indicated by arrow C. Specifically, as the object 0 hits the movable actuation portion 66, the rod 30 moves with respect to the frame 16 from a first rod position (FIG. 5) toward a second rod position (FIG. 6). The movement of the rod 30 causes the extensions 64B to contact a respective wheel stabilizer 28B. Consequently, the wheel stabilizers 28B move with respect to the frame 16 from disengaged positions (FIG. 5) toward the engaged positions (FIG. 6). In particular, as each extensions 64B pushes a respective wheel stabilizer 28B, the wheel stabilizers 28B pivot with respect to the frame 16 in the second rotational direction R2 toward the engaged positions (FIG. 6).

Figure 7:
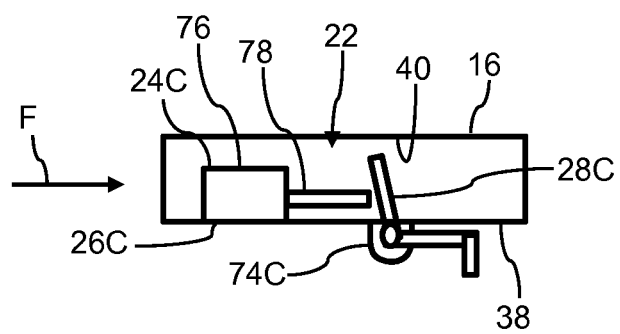
FIG. 7 is a schematic top view of a wheel stabilization mechanism for a wheel in accordance with another embodiment of the present disclosure, depicting the wheel stabilizer in a disengaged position and a plunger in a first plunger position.
Figure 8:
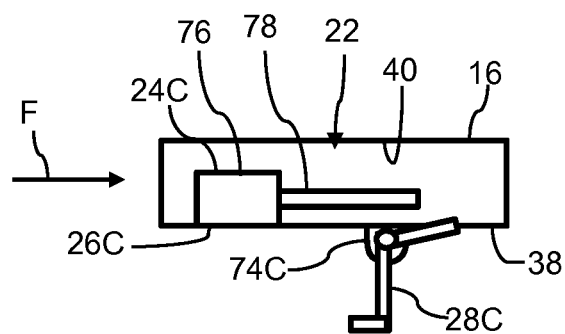
FIG. 8 is a schematic top view of the wheel stabilization mechanism shown in FIG. 7, depicting the wheel stabilizer in an engaged position and the plunger in a second plunger position.

With reference to FIGS. 7 and 8, a wheel stabilization mechanism 24C in accordance with another embodiment of the present disclosure is partly disposed in the interior frame cavity 22 of the frame 16. The wheel stabilization mechanism 24C includes an actuator 26C and at least one wheel stabilizer 28C movably coupled to the frame 16. A hinge assembly 74C, a pivot pin or any other suitable apparatus may pivotally couple the wheel stabilizer 28C to the outer frame surface 38 of the frame 16. As such, the wheel stabilizer 28C can move with respect to the frame 16 between a disengaged position (FIG. 7 and an engaged position (FIG. 8). The hinge assembly 74C may be substantially similar or identical to the hinge assembly 74 shown in FIG. 5. The wheel stabilizer 28C may be substantially similar or identical to the wheel stabilizer 28B shown in FIG. 5.

The actuator 26C includes an actuator body 76 and a plunger 78 movably coupled to the actuator body 76. The plunger 78 may be a piston and is configured to move with respect to the wheel stabilizer 28C between a first plunger position (FIG. 7) and a second plunger position (FIG. 8). Specifically, upon actuation, the actuator 26C drives the plunger 78 in the first direction indicated by arrow F toward a portion of the wheel stabilizer 28C. Eventually, the plunger 78 pushes the wheel stabilizer 28. As a consequence, the wheel stabilizer 28C moves with respect to the frame 16 from the disengaged position (FIG. 7) toward the engaged position (FIG. 8).

Figure 9:
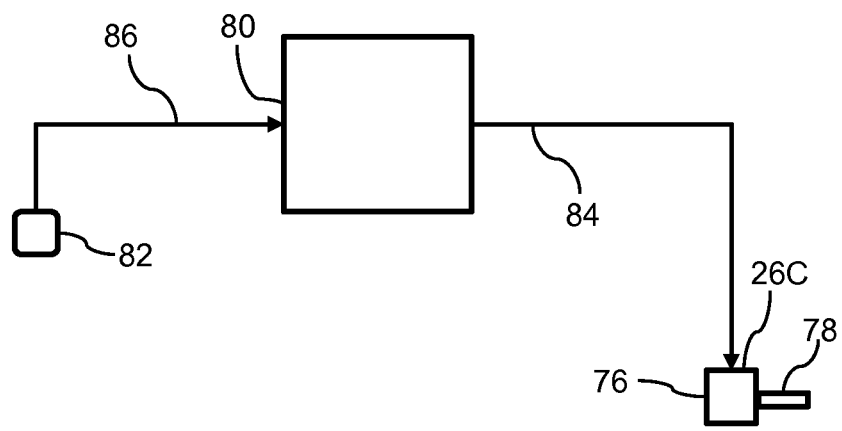
FIG. 9 is a schematic hardware diagram of a wheel stabilization system including the plunger portion of the wheel stabilization mechanism shown in FIG. 7, a sensor, and a controller.

With reference to FIG. 9, the actuator 26C moves the plunger 78 toward the wheel stabilizer 28C upon receipt of a deploy signal. To this end, the actuator 26C is in electronic communication with a controller 80 via any suitable bus or network such as a local area network (LAN). In the depicted embodiment, a first bus 84 electronically couples the actuator 26C to the controller 80. The controller 80 includes a Sensing Diagnosis Module (SDM). Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. Controller 80 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators such as the actuator 26C. Loop cycles may be executed at regular intervals, for example each 3.125, 6.25, 12.5, 25 and 100 milliseconds during ongoing engine and vehicle operation. Alternatively, algorithms may be executed in response to the occurrence of an event. Thus, the controller 80 may include one or more processors and a non-transitory computer readable medium storing program instructions. The processor may execute the program instructions stored on the computer readable medium upon the occurrence of one or more events.

The controller 80 is in electronic communication with one or more sensors 82 via any suitable bus or network. In the depicted embodiment, a second bus 86 electronically couples the controller 80 to the sensor 82. The sensor 82 may be an accelerometer and is coupled to the vehicle body 12 (FIG. 1). The sensor 82 and the controller 80 may be collectively referred to as the sensing system. The sensing system may be a system that is already in electronic communication with an airbag deployment system. Alternatively, the vehicle 10 (FIG. 1) may include a sensing system that is only electronically coupled to the actuator 26C. During an impact, the sensor 82 detects an impact to the vehicle body 12 (FIG. 1) and sends an impact signal including impact information to the controller 82. In other words, the sensor 82 can detect an impact. In response, the controller 80 is configured to process the impact signal and send a deploy signal to the actuator 26C if necessary. Upon receipt of the deploy signal, the actuator 26C actuates to move the plunger 78 with respect to the frame 16 from the first plunger position (FIG. 7) toward the second plunger position (FIG. 8).

Figure 10:
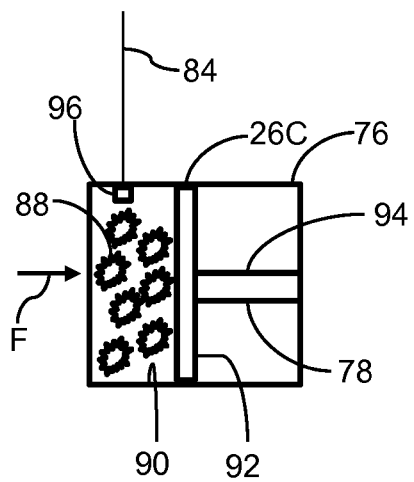
FIG. 10 is a schematic top view of the plunger portion of the wheel stabilization system shown in FIG. 9, depicting a propellant within the plunger portion of the wheel stabilization mechanism and the wheel stabilizer in a disengaged position.
Figure 11:
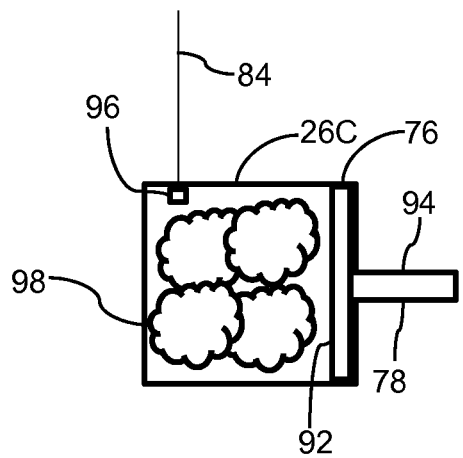
FIG. 11 is a schematic top view of the plunger portion of the wheel stabilization system shown in FIG. 9, depicting an ignition of the propellant with the wheel stabilizer in an engaged position.

With reference to FIGS. 10 and 11, the actuator body 76 defines an interior actuator cavity 90 containing a propellant 88, such as gasoline and air. The plunger 78 includes a plunger plate 92 and a plunger shaft 94 coupled to the plunger plate 92. The plunger plate 92 is disposed in the interior actuator cavity 90 and is configured to slide within the actuator body 76. Because the plunger shaft 94 is coupled to the plunger plate 92, the plunger shaft 94 can move with respect to the actuator body 76 as the plunger plate 92 moves within the actuator body 76.

The actuator 26C further includes an igniter 96, such as a spark plug, configured to emit a spark upon receipt of the deploy signal from the controller 80. To this end, the igniter 96 is at least partly disposed in the interior actuator cavity 90 and is electronically coupled to the controller 80 via the first bus 84. Upon receipt of the deploy signal from the controller 80, the igniter 96 emits a spark to combust the air/propellant mixture in the actuator body 76 to expand gases 98 inside the actuator body 76. The expanding gases 98 move the plunger plate 92 in the first direction indicated by arrow F. As a result, the plunger shaft 94 also moves with respect to the actuator body 76 in the first direction indicated by arrow F.

Figure 12:
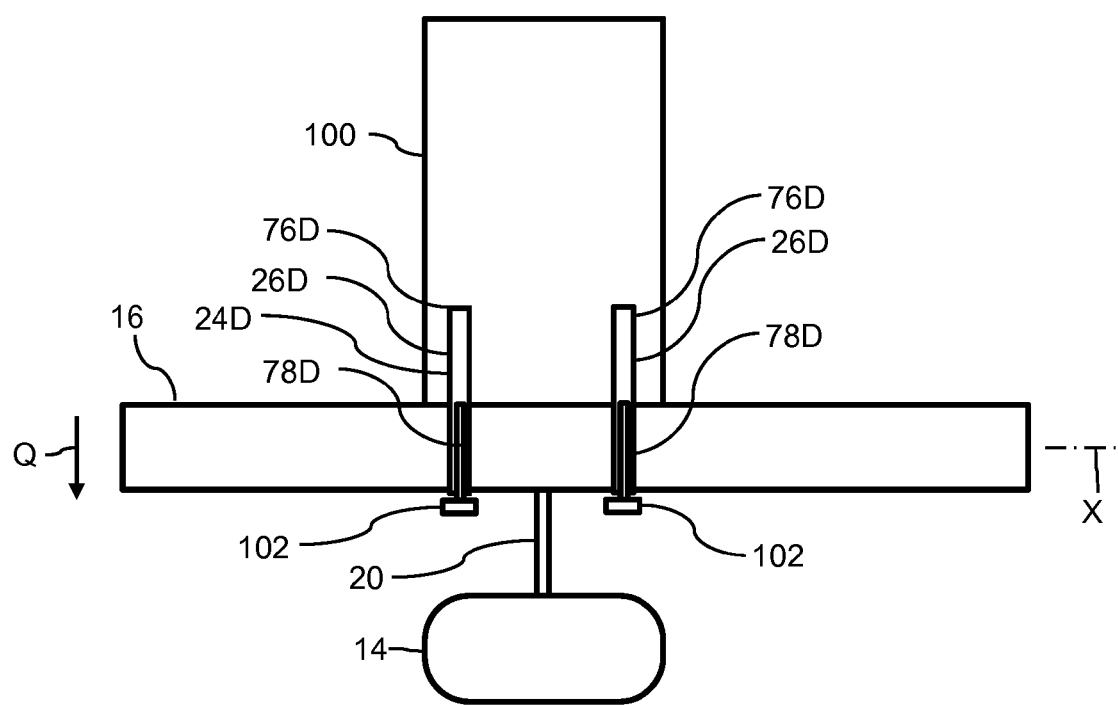
FIG. 12 is a schematic top view of a portion of a vehicle including a wheel stabilization mechanism in accordance with another embodiment of the present disclosure, depicting each wheel stabilizer in a disengaged position.
Figure 13:
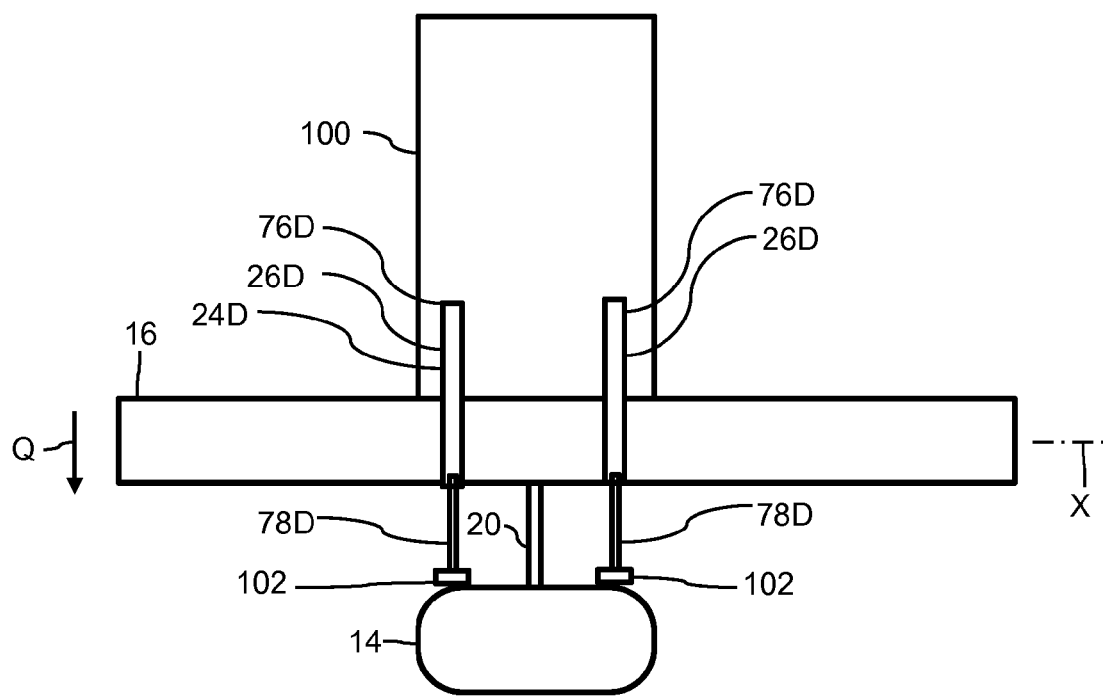
FIG. 13 is a top schematic view of a portion of the vehicle shown in FIG. 12, depicting each wheel stabilizer in an engaged position.

FIGS. 12 and 13 illustrate a wheel stabilization mechanism 24D in accordance with another embodiment of the present disclosure. The wheel stabilization mechanism 24D includes one or more actuators 26D coupled to an engine cradle 100 supporting the engine of the vehicle 10 (FIG. 1). The structure and operation of the actuators 26D are substantially similar or identical to the structure and operation of the actuators 26C described above. Thus, each actuator 26D includes an actuator body 76D and a plunger 78D movably coupled to the actuator body 76D. Each plunger 78D is configured to move with respect to a respective actuator body 76D from a disengaged position (FIG. 12) toward an engaged position (FIG. 13) upon receipt of a deploy signal from the controller 80 (FIG. 9). Specifically, each plunger 78D can move toward the wheel 14 in a fifth direction indicated by an arrow Q when a respective actuator 26D receives the deploy signal from the controller 80 (FIG. 9) The fifth direction, which is indicated by arrow Q, may be substantially perpendicular to the longitudinal axis X. In this embodiment, the wheel stabilization mechanism 24D does not include separate wheel stabilizers. Rather, the plungers 78D serve as wheel stabilizers. To this end, each plunger 78D may include a substantially rigid front plate 102. When the plungers 78D are in the engaged position (FIG. 13), the front plates 102 may contact the wheel 14 to minimize its movement during an impact.

Figure 14:
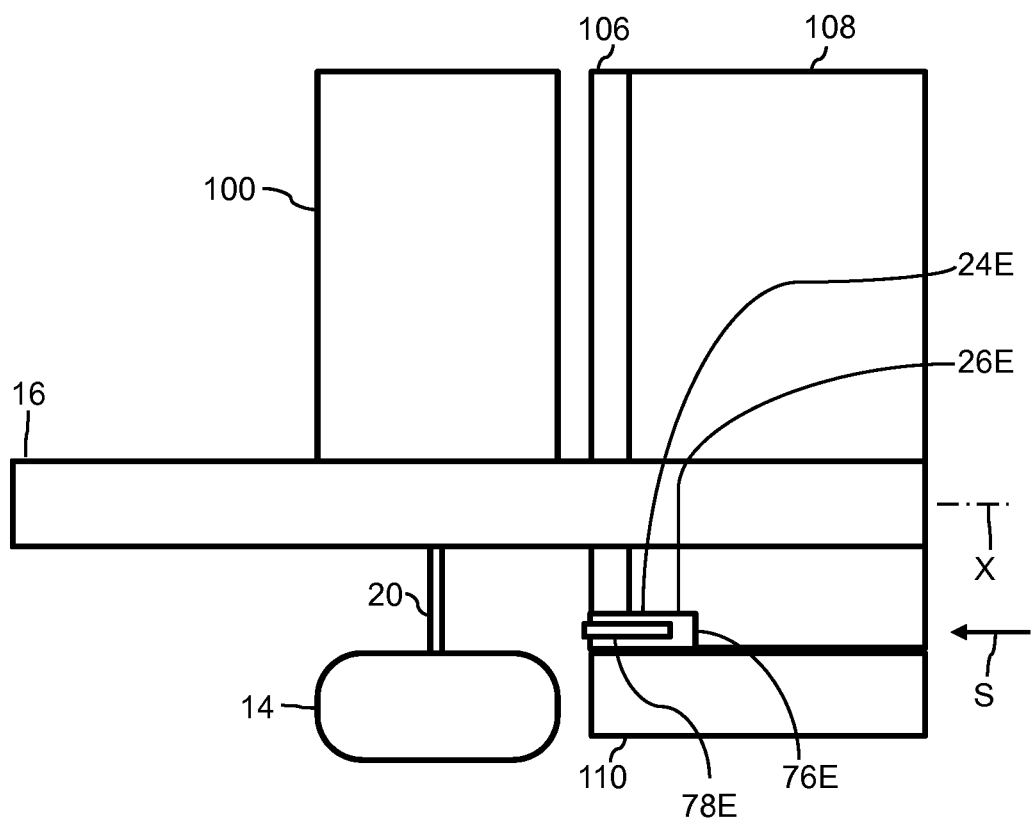
FIG. 14 is a schematic top view of a portion of a vehicle including a wheel stabilization mechanism in accordance with another embodiment of the present disclosure, showing a wheel stabilizer in a disengaged position.
Figure 15:
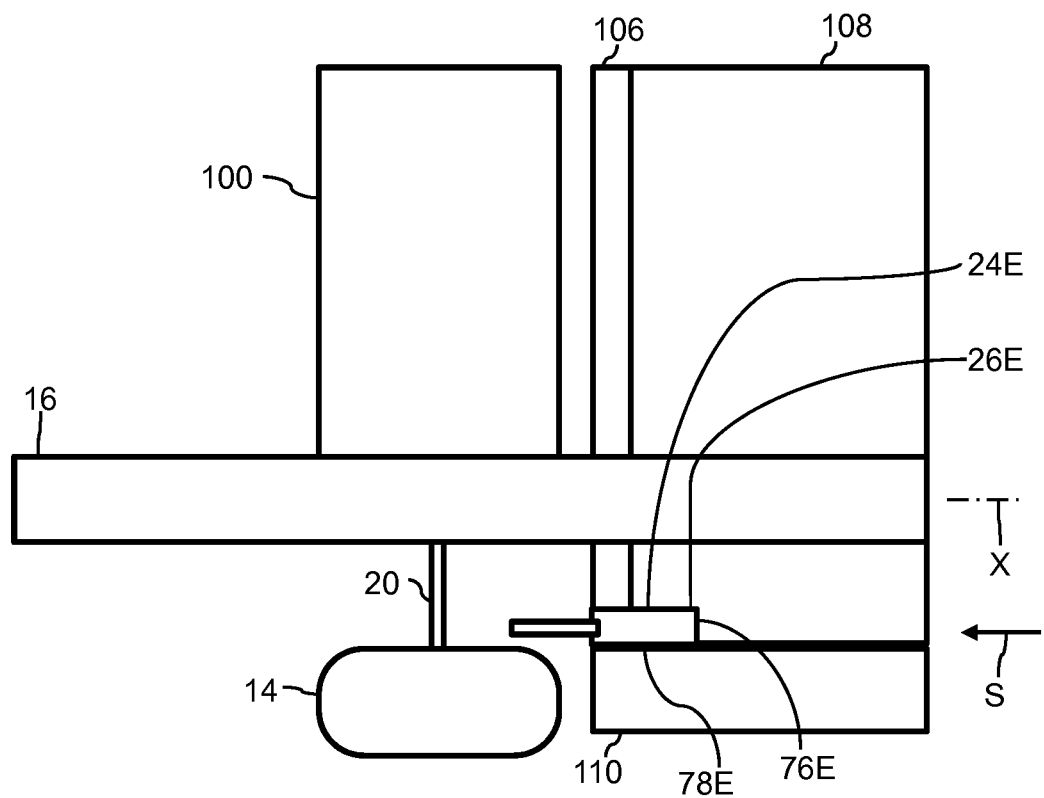
FIG. 15 is a schematic top view of the portion of the vehicle shown in FIG. 14, depicting the wheel stabilizer in an engaged position.

FIGS. 14 and 15 illustrate a wheel stabilization mechanism 24E in accordance with another embodiment of the present disclosure. The wheel stabilization mechanism 24E includes one or more actuators 26E coupled to a rocker panel 110 of the vehicle 10 (FIG. 1). For illustration purposes, FIGS. 14 and 15 also illustrate the engine cradle 100, a dash 106, and a vehicle floor 108. The structure and operation of the actuator 26E is substantially similar or identical to the structure and operation of the actuators 26C (FIG. 7) described above. Hence, the actuator 26E includes an actuator body 76E and a plunger 78E movably coupled to the actuator body 76E. The plunger 78E is configured to move with respect to the rocker panel 110 in a sixth direction, which is indicated by arrow S, from a disengaged position (FIG. 14) toward an engaged position (FIG. 15) when the actuator 26E receives a deploy signal from the controller 80. The sixth direction, which is indicated by arrow S, may be substantially parallel to the longitudinal axis X. In this embodiment, the wheel stabilization mechanism 24E does not include separate wheel stabilizers. Rather, the plunger 78E servers as a wheel stabilizer.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A wheel stabilization mechanism, comprising:
an actuator coupled to a vehicle body;
a wheel stabilizer movably coupled to the vehicle body such that the wheel stabilizer is configured to move with respect to a wheel, wherein the vehicle body includes a frame coupled to the wheel, and the actuator includes a rod movably coupled to the frame;
wherein the actuator is configured to move the wheel stabilizer relative to the wheel from a disengaged position toward an engaged position in response to a force applied to the vehicle body; and
wherein, in the engaged position, the wheel stabilizer is configured to inhibit at least a portion of the wheel from moving relative to the vehicle body to minimize movement of the wheel relative to the vehicle body.

2. The wheel stabilization mechanism of claim 1, wherein the force is eccentric to a longitudinal axis of the vehicle body and the frame includes a first frame end and a second frame end opposite the first frame end, and wherein the actuator further includes a plate coupled to the rod, the plate being adjacent the first frame end.

3. The wheel stabilization mechanism of claim 2, wherein the rod is configured to urge the wheel stabilizer to move from the disengaged position toward the engaged position as the rod moves from the first rod position toward the second rod position.

4. The wheel stabilization mechanism of claim 1, wherein the rod is configured to move relative to the frame from a first rod position toward a second rod position in response to the force applied to the vehicle body.

5. The wheel stabilization mechanism of claim 4, wherein the wheel stabilizer includes a lever pivotally coupled to the frame.

6. A vehicle comprising:
a vehicle body;
a wheel coupled to the vehicle body, wherein the vehicle body includes a frame configured to be coupled to the wheel;
an actuator coupled to the vehicle body, wherein the actuator includes a rod movably coupled to the frame;
a wheel stabilizer movably coupled to the vehicle body;
wherein the actuator is configured to move the wheel stabilizer with respect to the wheel from a disengaged position and an engaged position in response to a force applied to the vehicle body; and
wherein, in the engaged position, the wheel stabilizer is configured to inhibit at least a portion of the wheel from moving with respect to the vehicle body to minimize movement of the wheel with respect to the vehicle body.

7. The vehicle of claim 6, wherein the rod is configured to move with respect to the frame from a first rod position toward a second rod position in response to the force applied to the vehicle body.

8. The vehicle of claim 6, wherein the wheel stabilizer includes a lever pivotally coupled to the frame.

9. A method of controlling a crush mode of a vehicle body structure movable longitudinally and rollingly supported on a tire/wheel rotatable in a longitudinal plane, comprising:
providing said vehicle body structure with a tire/wheel stabilizer actuatable between first and second positions with respect to said tire/wheel; and
actuating, using an actuator, said tire/wheel stabilizer to one of said positions in response to a vehicle impact eccentric to a longitudinal movement of said vehicle body structure;
wherein the vehicle body structure includes a frame coupled to the tire/wheel; and
wherein the actuator includes a rod movably coupled to the frame.

* * * * *